(12) United States Patent
Long

(10) Patent No.: US 9,916,468 B2
(45) Date of Patent: *Mar. 13, 2018

(54) SYSTEM AND METHOD FOR DETECTING FRAUD AND MISUSE OF PROTECTED DATA BY AN AUTHORIZED USER USING EVENT LOGS

(71) Applicant: Kurt James Long, Clearwater, FL (US)

(72) Inventor: Kurt James Long, Clearwater, FL (US)

(73) Assignee: FAIRWARNING IP, LLC, Clearwater, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/954,470

(22) Filed: Nov. 30, 2015

(65) Prior Publication Data
US 2016/0085986 A1     Mar. 24, 2016

Related U.S. Application Data

(63) Continuation of application No. 14/102,017, filed on Dec. 10, 2013, now Pat. No. 9,202,189, and a
(Continued)

(51) Int. Cl.
*G06F 21/62* (2013.01)
*G06F 21/55* (2013.01)
(Continued)

(52) U.S. Cl.
CPC .......... *G06F 21/6218* (2013.01); *G06F 21/50* (2013.01); *G06F 21/55* (2013.01);
(Continued)

(58) Field of Classification Search
CPC ...... G06F 21/55; G06F 11/3476; G06F 21/16; G06F 21/6218
(Continued)

(56) References Cited

U.S. PATENT DOCUMENTS 5,557,742 A     9/1996  Smaha et al.
6,173,418 B1 *  1/2001  Fujino ................. G06F 11/3476
                                                          714/20

(Continued)

FOREIGN PATENT DOCUMENTS

EP          1054529 A2     11/2000

OTHER PUBLICATIONS

Denning D E: "An Intrusion-Detection Model," IEEE Transactions on Software Engineering, IEEE Service Center, Los Alamitos, CA, vol. SE-13, No. 2, Feb. 1, 1987 (Feb. 1, 1987)< pp. 222-232.

(Continued)

*Primary Examiner* — Hadi Armouche
*Assistant Examiner* — Bryan Wright
(74) *Attorney, Agent, or Firm* — Hauptman Ham, LLP

(57) ABSTRACT

A system and method are provided for detecting fraud and/or misuse of data in a computer environment through generating a rule for monitoring at least one of transactions and activities that are associated with the data. The rule can be generated based on one or more criteria related to the at least one of the transactions and the activities that is indicative of fraud or misuse of the data. The rule can be applied to the at least one of the transactions and the activities to determine if an event has occurred, where the event occurs if the at least one criteria has been met. A hit is stored if the event has occurred and a notification can be provided if the event has occurred. A compilation of hits related to the rule can be provided.

19 Claims, 10 Drawing Sheets

Related U.S. Application Data continuation of application No. 13/959,445, filed on Aug. 5, 2013, now abandoned, which is a continuation of application No. 11/687,864, filed on Mar. 19, 2007, now Pat. No. 8,578,500, which is a continuation of application No. 11/420,645, filed on May 26, 2006, now abandoned.

(60) Provisional application No. 60/685,655, filed on May 31, 2005.

(51) Int. Cl.
*G06F 21/50* (2013.01)
*G06F 21/60* (2013.01)
*G06Q 10/06* (2012.01)
*G06F 21/31* (2013.01)

(52) U.S. Cl.
CPC ............ *G06F 21/554* (2013.01); *G06F 21/60* (2013.01); *G06Q 10/0635* (2013.01); *G06F 21/316* (2013.01); *G06F 2221/034* (2013.01)

(58) Field of Classification Search
USPC .......................................................... 726/22
See application file for complete search history.

(56) References Cited

U.S. PATENT DOCUMENTS

| | | | |
|---|---|---|---|
| 6,347,374 B1 | 2/2002 | Drake et al. | |
| 6,405,318 B1 | 6/2002 | Rowland | |
| 6,549,208 B2 | 4/2003 | Maloney et al. | |
| 6,789,202 B1 | 9/2004 | Ko et al. | |
| 6,978,303 B1 * | 12/2005 | McCreesh | G06F 11/3423 709/224 |
| 7,873,528 B2 * | 1/2011 | Bregante | G06F 19/328 705/2 |
| 8,063,765 B2 * | 11/2011 | Johnson | G06F 21/554 307/116 |
| 8,578,500 B2 * | 11/2013 | Long | G06F 21/55 726/22 |
| 8,781,296 B2 * | 7/2014 | Kim | H04N 21/44236 386/239 |
| 9,202,189 B2 * | 12/2015 | Long | G06F 21/55 |
| 2003/0037251 A1 * | 2/2003 | Frieder | G06F 21/552 726/23 |
| 2003/0229519 A1 | 12/2003 | Eidex et al. | |
| 2004/0260945 A1 | 12/2004 | Raikar et al. | |
| 2005/0027848 A1 | 2/2005 | Kamenetsky et al. | |
| 2005/0044386 A1 * | 2/2005 | Libin | H04L 9/00 713/185 |
| 2005/0066165 A1 * | 3/2005 | Peled | G06F 21/316 713/165 |
| 2005/0086529 A1 * | 4/2005 | Buchsbaum | G06F 21/55 726/4 |
| 2005/0177877 A1 * | 8/2005 | Hiramatsu | A01K 67/033 800/4 |
| 2006/0224419 A1 * | 10/2006 | Servizio | G06F 19/3456 705/2 |
| 2006/0282660 A1 | 12/2006 | Varghese et al. | |
| 2007/0039049 A1 | 2/2007 | Kuferman et al. | |
| 2007/0073743 A1 * | 3/2007 | Bammi | G06F 21/16 |
| 2009/0089094 A1 * | 4/2009 | Stockton | G06F 21/552 705/3 |
| 2009/0300322 A1 * | 12/2009 | Mercer | H04L 63/10 711/219 |
| 2010/0063841 A1 * | 3/2010 | D'Ambrosia | G06F 19/322 705/3 |

OTHER PUBLICATIONS

Debar et al.: "Towards a taxonomy of intrusion-detection systems," Computer Networks, Elsevier Science Publishers B.V., Amsterdam, NL, vol. 31, No. 8, Apr. 23, 1999 (Apr. 23, 1999), pp. 805-822.
European Search Report for 08 743 964.2 dated May 9, 2011.
"Security Management" eTrust Audit. 2006. http://www3.ca.com/solutions/Product.aspx?ID=157.
*FairWarning IP, LLC* v. *Iatric Systems, Inc.*, No. 15/1985, slip op. (Fed. Cir. Oct. 11, 2016).
*FairWarning IP, LLC* v. *Iatric Systems, Inc.*, No. 16/1096 (Fed. Cir. Oct. 11, 2016).

* cited by examiner

```xml
<?xml version="1.0" encoding="UTF-8" ?>
- <LogFormatDefinition definitionName="SharePoint" compatibleWith="web">
- <event numLines="1">
- <timeStampFields>
<numTSFields>2</numTSFields>
<concatWith />
<formatString>yyyy-mm-ddHH:mm:ss</formatString>
<tsField>date</tsField>
<tsField>time</tsField>
</timeStampFields>
- <parseRules>
- <!-- rules for parsing whole lines of data like ignore rules -->
- <rule ruleType="ignore" constraint="startsWith">
- <!-- constraint values: startsWith, endsWith, contains -->
<searchString text="comment line">#</searchString>
- <!-- ignore lines that start with # because they are comment lines -->
</rule>
</parseRules>
- <field fieldName="date" parseType="delimited">
- <!-- parseType values: delimited, bounded, indexed -->
<delimiter />
<delimitedIndex>0</delimitedIndex>
</field>
- <field fieldName="time" parseType="delimited">
<delimiter />
<delimitedIndex>1</delimitedIndex>
</field>
- <field fieldName="serverip" parseType="delimited">
<delimiter />
<delimitedIndex>2</delimitedIndex>
</field>
- <field fieldName="method" parseType="delimited">
<delimiter />
<delimitedIndex>3</delimitedIndex>
</field>
- <field fieldName="uri" parseType="delimited">
<delimiter />
<delimitedIndex>4</delimitedIndex>
</field>
- <field fieldName="query" parseType="delimited">
<delimiter />
<delimitedIndex>5</delimitedIndex>
</field>
- <field fieldName="username" parseType="delimited">
<delimiter />
<delimitedIndex>7</delimitedIndex>
</field>
- <field fieldName="clientip" parseType="delimited">
<delimiter />
<delimitedIndex>8</delimitedIndex>
</field>
- <field fieldName="httpstatus" parseType="delimited">
<delimiter />
<delimitedIndex>10</delimitedIndex>
</field>
- <field fieldName="s-port" parseType="delimited">
<delimiter />
<delimitedIndex>6</delimitedIndex>
</field>
- <field fieldName="cs(User-Agent)" parseType="delimited">
<delimiter />
<delimitedIndex>9</delimitedIndex>
</field>
</event>
</LogFormatDefinition>
```

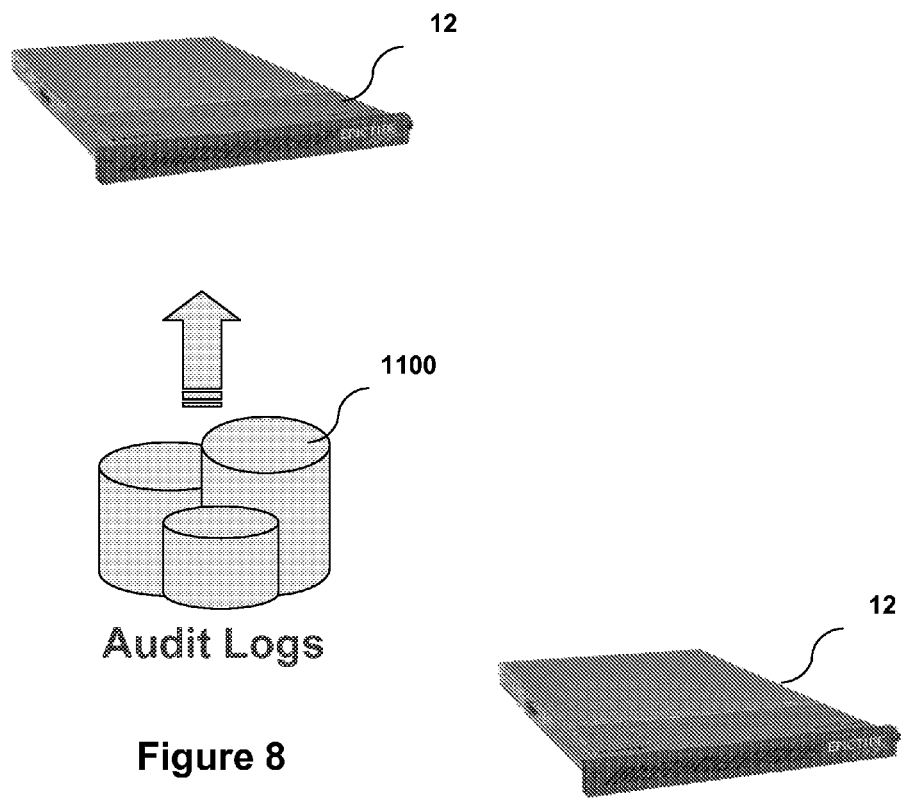
Figure 8
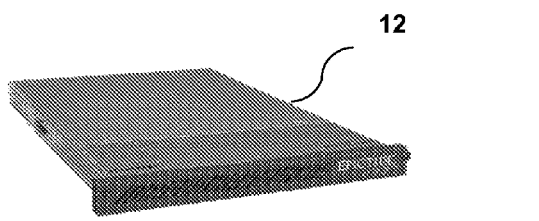
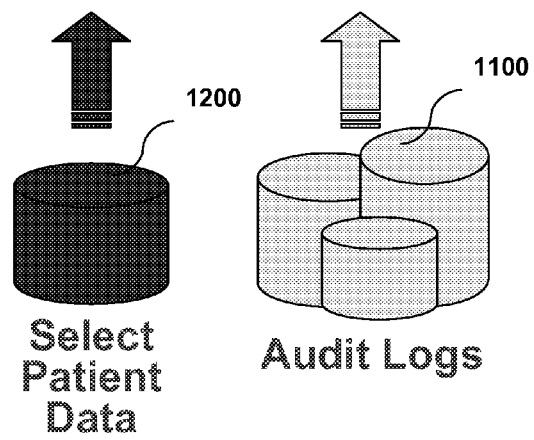
Figure 9

SYSTEM AND METHOD FOR DETECTING FRAUD AND MISUSE OF PROTECTED DATA BY AN AUTHORIZED USER USING EVENT LOGS

CROSS-REFERENCE TO RELATED APPLICATIONS

This application is a continuation-in-part of U.S. patent application Ser. No. 11/420,645, filed on May 26, 2006, which claims priority to U.S. Provisional Application Ser. No. 60/685,655, filed May 31, 2005, the entire contents of which are incorporated herein by reference.

FIELD OF THE INVENTION

The invention relates to a system and method of detecting fraud and/or misuse in a computer environment based on analyzing data such as in log files, or other similar records, including user identifier data. More particularly, the invention relates to a system and method of detecting fraud and/or misuse in a computer environment based on analyzing application layer data such as in log files, including user identifier data.

BACKGROUND OF THE INVENTION

Conventional systems for detecting fraud or misuse by users are deficient at least because conventional systems have limited abilities to recognize log file formats and access the log files. This is especially difficult when a system accesses file logs that are generated by different applications, since each application may generate a different log file format.

Other problems with conventional systems include that users may have several different ways of accessing company (or other similar organizations) systems. For example, in many instances, users may use several different user-ids and passwords to access different applications or data stores of an organization. Fraud or misuse detection systems may have no way in correlate the activity of the user across the various applications. Likewise, in some instances, evaluating the behavior of a user based on one application may not provide enough information to discern a pattern of behavior that may be indicative of fraud or misuse of a company's system or information.

Some of the prior art systems related to detecting fraud and misuse of a system are described in U.S. Pat. No. 5,557,742 (Method and System for Detecting Intrusion Into and Misuse of a Data Processing System), U.S. Pat. No. 6,347,374 (Event Detection), U.S. Pat. No. 6,405,318 (Intrusion Detection System), and U.S. Pat. No. 6,549,208 (Information Security Analysis System). Various other drawbacks exits with these systems and with other systems known in the art.

SUMMARY OF THE INVENTION

Various aspects of the invention overcome at least some of these and other drawbacks of existing systems. According to one embodiment, a system and method are provided for tracking a user across logs at an application layer of various applications that a user may access.

According to one embodiment, event log files may be accessed by a monitoring system, wherein the event log files are associated with known users or users whose identity the system can derive. The event logs may be compilations of recorded transactions and/or activities that are recorded by applications and access layer devices. According to one embodiment, the events contained in the event logs may be extracted by the monitoring system. The extracted events may be normalized into records that are suitable for analysis, storage and/or reporting. The normalized events may be analyzed against fraud scenarios that are defined for a given environment. According to one embodiment, the events may be correlated to users of the systems and the event records may contain identifiers that correlate to known users.

According to one embodiment, the normalized and correlated events may be analyzed for user specific fraud monitoring scenarios that are modeled based on a user's specific identity or role/relationship with an organization.

According to one embodiment, a method of detecting fraud or misuse of data in a computer environment is provided. The method comprises generating a rule for monitoring at least one of transactions and activities that are associated with the data, with the rule comprising at least one criteria related to the at least one of the transactions and the activities that is indicative of fraud or misuse of the data; applying the rule to the at least one of the transactions and the activities to determine if an event has occurred, with the event occurring if the at least one criteria has been met; storing a hit if the event has occurred; providing notification if the event has occurred; and providing a compilation of hits related to the rule.

According to one embodiment, a system for detecting fraud or misuse of data in a computer environment is provided. The system comprises a user interface for selection of at least one criteria related to at least one of transactions and activities associated with the data that is indicative of fraud or misuse of the data and for selection of a schedule for application of a rule for monitoring the at least one of the transactions and the activities; and a microprocessor in communication with the user interface and having access to the transactions and the activities of the data. The microprocessor generates the rule based at least in part on the at least one criteria selected and applies the rule to the at least one of the transactions and the activities according to the schedule selected to determine if an event has occurred. The event occurs if the at least one criteria has been met. The microprocessor stores a hit if the event has occurred and provides notification if the event has occurred. The microprocessor generates a compilation of hits related to the rule.

According to one embodiment, a computer readable program embodied in an article of manufacture comprising computer readable program instructions for detecting fraud or misuse of data in a computer environment is provided. The program comprises program instructions for causing the computer to provide a selection of at least one criteria related to at least one of transactions and activities associated with the data that is indicative of fraud or misuse of the data; program instructions for causing the computer to generate a rule based at least in part on the at least one criteria for monitoring the at least one of the transactions and the activities; program instructions for causing the computer to provide a selection for a schedule for application of the rule to the at least one of the transactions and the activities; program instructions for causing the computer to apply the rule according to the schedule selected to the at least one of the transactions and the activities to determine if an event has occurred, with the event occurring if the at least one criteria has been met; program instructions for causing the computer to store a hit if the event has occurred; program instructions for causing the computer to provide notification if the event has occurred; and program instructions for causing the computer to provide a compilation of hits related to the rule.

The invention has numerous advantages over and avoids many drawbacks of prior systems. These and other objects, features and advantages of the invention will be apparent through the detailed description of the embodiments and the drawings attached thereto. It is also to be understood that both the foregoing general description and the following detailed description are exemplary and not restrictive of the scope of the invention. Numerous other objects, features and advantages of the invention should now become apparent upon a reading of the following detailed description when taken in conjunction with the accompanying drawings, a brief description of which is included below.

BRIEF DESCRIPTION OF THE DRAWINGS

FIG. 3 illustrates exemplary XML definitions according to one embodiment of the invention that may be used for event parsing.

FIG. 8 illustrates a flow chart for detection of various fraud or misuse scenarios based upon audit logs in another embodiment of the invention.

FIG. 9 illustrates a flow chart for detection of various fraud or misuse scenarios based upon audit logs and select patient data in another embodiment of the invention.

DETAILED DESCRIPTION OF THE INVENTION

Figure 1A:
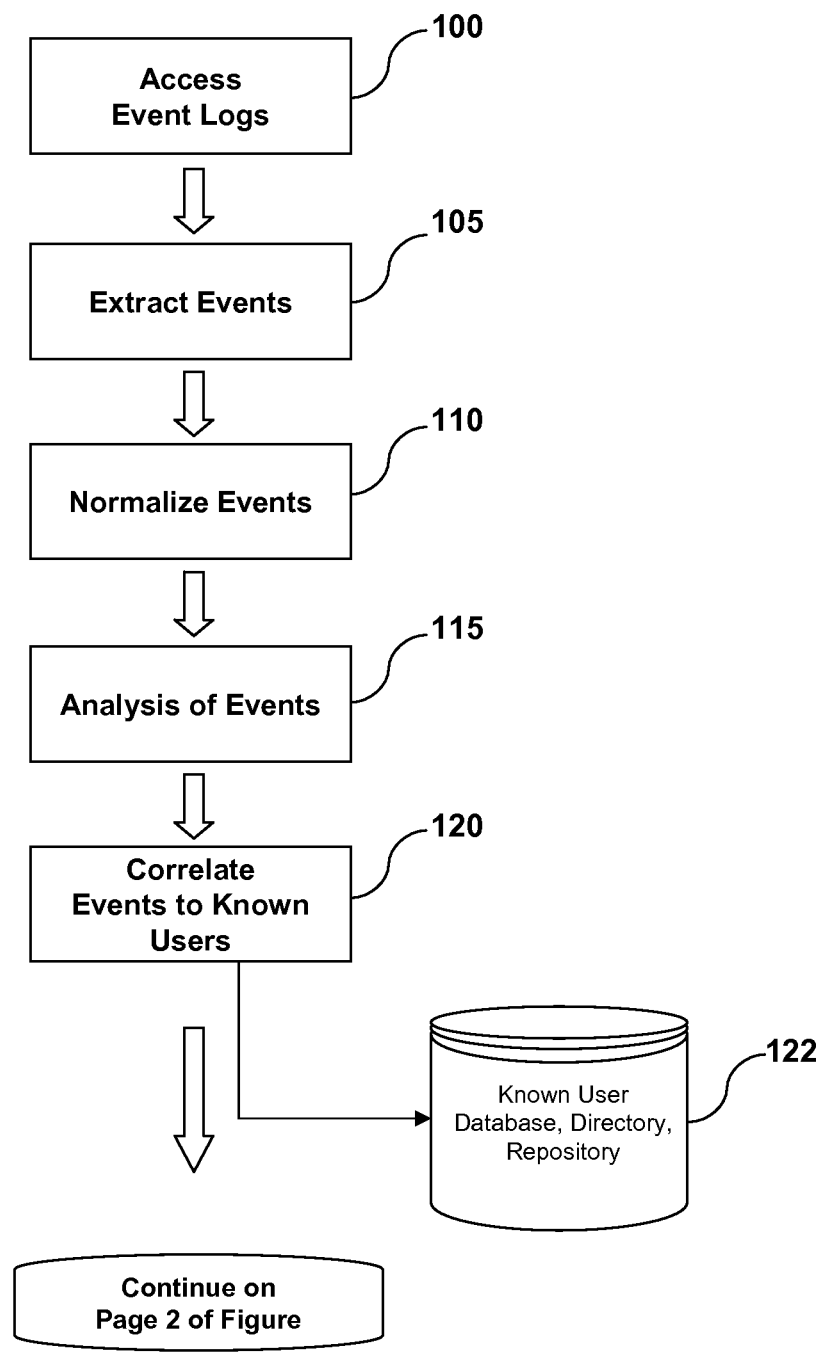
FIGS. 1A and 1B illustrate a flow chart of a process flow according to one embodiment of the invention.
Figure 1B:
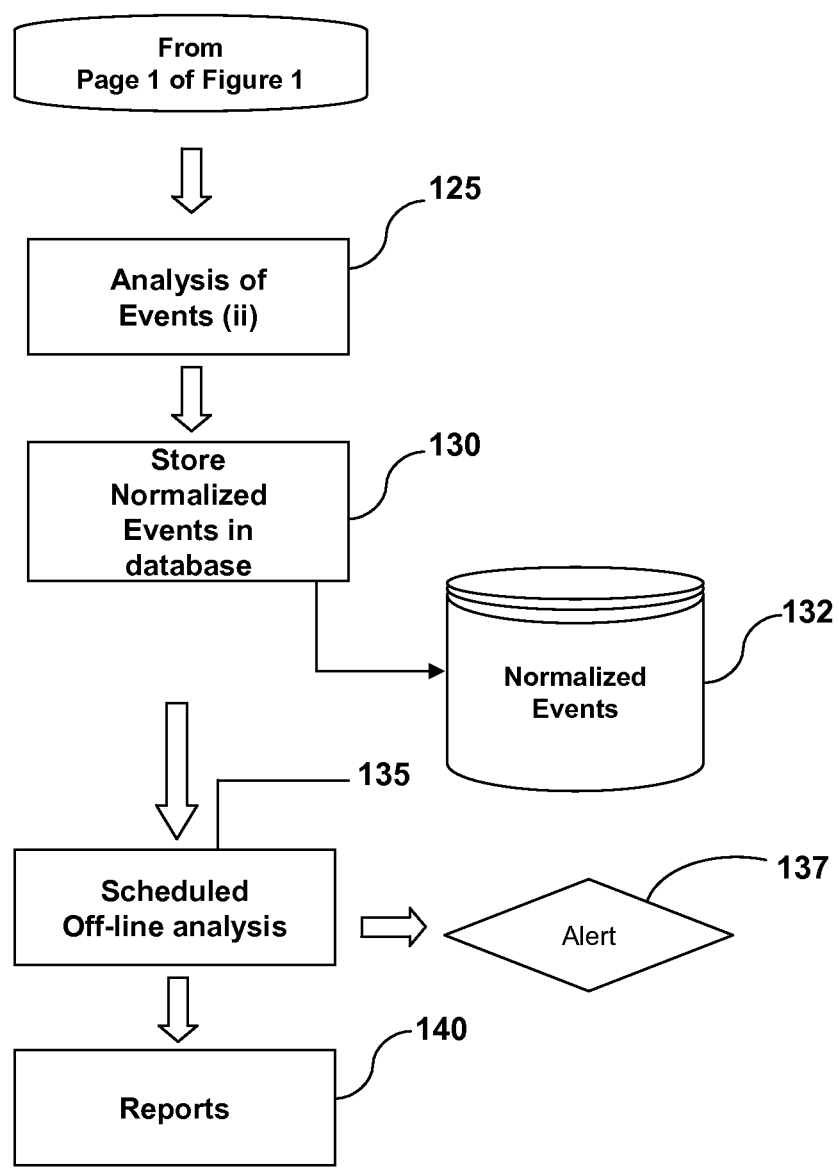

FIGS. 1A and 1B together form a flow chart that illustrate some of the processes in one embodiment of the invention. In step 100, event log files (hereinafter event logs) are accessed by a monitoring system that is provided by the invention. According to one embodiment, event logs are data stores containing events, associated with known users, that are accessed by the system from servers and devices on a network. According to an alternative embodiment of the invention, event logs may include temporary storage devices. According to another embodiment, event logs may be sent to the monitoring system via protocols and message sets. Whether accessed on servers or received via messages, the monitoring system accesses event logs associated with known users or users whose identity the system can derive.

According to one embodiment, the event logs may be compilations of recorded transactions and/or activities that are recorded by applications and access layer devices. According to one embodiment, these may include servers and applications such as VPN devices, third party applications, in-house applications, web servers, single sign on servers, databases, e-mail servers, print servers, fax servers, phone systems and any other device or server that contains or generates event information based on a known user's use or interaction with an organization's information systems. The collection of data from the event logs is scheduled by the monitoring system to be conducted periodically or performed in real-time as the events are generated.

According to one embodiment, in operation 105, the events that are contained in the event logs may be extracted by the monitoring system using, for example, a parsing engine. According to one embodiment, the parsing engine may be an application that is configurable, for example, by using XML templates. According to one embodiment, the parsing engine maintains XML templates (as an example of standard format for a known event) of known event logs and events. The XML templates also may contain information that identifies correlations between events and event logs and may further contain information on what is to be extracted from the event for subsequent analysis, storage and reporting. For example, the XML template may contain the format of the data contained in an event log so that the data in the event log may be easily correlated to known fields based on the XML template information. One skilled in the art would recognize that XML templates are one embodiment of such a template and other similar templates or mapping techniques could also be used as would be recognized by those skilled in the art. For never previously encountered event data formats, the parsing engine may be configured via manual definition and manipulation of a default XML template to create a suitable XML template, or configured via a tool with a graphical user interface to define the event format as would be within the abilities of one skilled in the art.

According to one embodiment, in operation 110, the extracted events may be normalized (using, for example, the above described templates) into records that are suitable for analysis, storage and reporting. As part of the normalization process, an event source identifier (or event log identifier), date/time, source network address, destination network address, text associated with the event, and transaction code may be placed into the record. Based on the source identifier, additional information may be stored in the record that may not be part of a standard normalized record. For example, the record may include information correlating the events to the event source identifiers. One skilled in the art would recognize that the fields listed here are exemplary only and those skilled in the art would recognize various alternatives and modifications all of which are considered as a part of the invention.

According to one embodiment, in operation 115, the normalized events may be analyzed against fraud scenarios that are defined for a given organizational environment. Examples of such analysis include monitoring for access to a specific type of record in a healthcare, financial service or mortgage environment, or monitoring for a volume of transactions over a specified time period. Alerting and off-line reports may be generated by the system. This stage of analysis is characterized by analyzing for scenarios that benefit from being detected rapidly. The analysis of fraud scenarios is discussed in greater detail further herein.

According to one embodiment, in operation 120, events may be correlated to users of the organization's systems. According to on embodiment, the event records may contain identifier(s) that correlate to known user. The listing of identifiers that identify a user may be stored or accessible in a data repository 122, as will be discussed in further detail further herein. These correlation identifiers (found in the event records) may include e-mail address, userid(s), database ids, phone number, session id, TCP/IP address, MAC address, single sign on id, or any other id (identifier) that may correlate uniquely to users in a given organization's environment. According to one embodiment, these identifiers may be placed into the normalized record, such that the normalized records are associated with known users. Using the identifier, the monitoring system may correlate the normalized events using a database, directory or general repository 122 of known users. According to one embodiment, events that can not be matched against known users (for example, users that cannot be identified based on the known users in the repository 122) may be maintained in a separate records list. According to another embodiment, attempts to match the records to known users may be performed in an off-line process which may be performed later in time or which may be initiated in near real-time by the monitoring system sending a message to initiate the matching of the unknown record. According to one embodiment, the monitoring system is capable of maintaining its own user repository 122. According to another embodiment, the monitoring system is capable of interfacing with an identity management repository, a single sign repository, a human resource repository, a ERP or any other repository of known users. Alternatively, the monitoring system may use a combined approach in which it first checks it own repository 122 before interfacing the other repositories of user information in an organization.

According to one embodiment, in operation 125, the normalized and correlated events may be analyzed using, for example, rules, algorithms, database queries, or other methods, for user specific fraud monitoring scenarios that are modeled based on a users specific identity or role/relationship with an organization. According to one embodiment, the fraud scenarios may be modeled and stored in XML templates. For example, monitoring system may include a template that is matched to determine whether a fraud or misuse scenario has arisen. Examples of fraudulent and misuse scenarios are discussed further herein.

According to one embodiment, in operation 132, the normalized and correlated events may be stored in a database 132 for subsequent analysis and reporting. According to one embodiment, events that are non-correlated with users may be maintained in a separate records list and attempts to match the records to known users may be performed in an off-line process.

According to one embodiment, in operation 135, the monitoring system may analyze the off-line database of normalized and correlated events 132 for fraud scenarios that can not be detected in real time due to data, time, or performance limitations. The monitoring system may produce alerts 137 if its off line analysis uncovers fraudulent scenarios. These alerts may be in the form of a report or message, winch alerts a responsible person to investigate the fraud or misuse scenario. According to another embodiment, the monitoring system may initiate preventive action, for example, by suspending the access of a known user whose activities have triggered the alert. According to another embodiment, in operation 140, the system may produce generalized security reporting based on transactions and access by authenticated users. Such reports may be used to track the security of an organization's systems or may be used for subsequent investigations, once a fraud or misuse scenario has been uncovered.

The following description provides specific embodiments for some of the operations discussed above. While specific embodiments of the invention are discussed herein and are illustrated in the drawings appended hereto, the invention encompasses a broader spectrum than the specific subject matter described and illustrated. As would be appreciated by those skilled in the art, the embodiments described herein provide but a few examples of the broad scope of the invention. There is no intention to limit the scope of the invention only to the embodiments described herein.

1. Accessing Events. According to one embodiment, the monitoring system is flexible in its ability to read events. According to one embodiment, an application layer protocol such as Simple Network Management Protocol (SNMP) may be used to facilitate the exchange of management information between network devices. The monitoring system simply needs programmatic input (or read) access to a given event source such as a log file. In the case of a log file, the log file may be accessible via a local hard drive, a network hard drive, and/or may be transferred locally via a file transfer protocol such as ftp. According to one embodiment, the monitoring system is also flexible enough to read from a local or remote database via protocols, such as ODBC, in order to access relevant events. Alternatively, a log file may be generated through the systematic extraction from one or more databases, and the generated log file(s) then transported via ftp to the local drive of the monitoring system. According to another embodiment, the monitoring system may provide a web service interface in order to receive events using a message protocol, such as Simple Object Access Protocol (SOAP). As previously stated, the monitoring system generally is flexible and uses programmatic (read) access to event sources.

2. Event Contents and Format. According to one embodiment, while the monitoring system is capable of processing any log event, it has the ability to process events that were directly or indirectly generated by known users (known, for example, to an organization) and then correlate those events to the known users. For user associated events, one general format of the event data that is tracked is outlined below. Of course, it should be recognized that this format is exemplary only and those skilled in the art would recognize various modifications and alternatives all of which are considered as a part of the present invention. One general format may include: [Date and Time Stamp] [User identifier] [Transaction Type] [Event Text] [Request Address] [Target Address] [Status Code] [Other Data]. Other formats are contemplated.

As would be recognized by one skilled in the art, the number of lines per event, field order, delimiters, field format, etc. may vary between applications, access servers, databases, etc. The monitoring system is sufficiently configurable to handle various events. The "User identifier" field may be a user-id, an e-mail address, a phone number, a database-id, a single sign on id, a TCP/IP address, a MAC address, a session id or any other identifier that ties the event to a known user. The applicability of the identifier may be dependent on the organization's environment, including user-id policies, application environments, network layouts, etc. The monitoring system is sufficiently configurable to allow for these variables in correlating the events to known users.

3. Event Definitions. According to one embodiment, the monitoring system may be flexible in its ability to process the above described events. According to one embodiment, the system may include a XML based description language that is used to specify the variables of a given event type such as fields, field order, field delimiters, number of lines per event, number of characters, field type and spoken language type. Multiple event types in a given event source (such as a log file) can also be similarly described. According to one embodiment, the definition of event types may be maintained in a directory that is known to the monitoring system so that they may be used whenever a given event type (which has a definition in the directory) is processed.

4. System Database Schemas. According to one embodiment, the monitoring system may maintain a set of schemas that correspond to the event types being processed. These schemes may be used to generate database tables. For example, "http common log format" has a pre-defined schema that the monitoring system maintains and can generally re-use whenever the events of a "http common log format" type are processed. According to another embodiment, the monitoring system may provide the ability to use a schema that associates fields that are unique to a specific event type to the storage format of an event. In other words, the system may be sufficiently configurable to handle event fields that are not part of a standard format as described above. For example, program logic based on keywords or certain alphanumeric sequences may be used to identify fields in an event data record and may correlate them to the standardized storage format of the normalized records.

According to one embodiment, the monitoring system may normalize events by mapping as many fields available as described above to the schema and table defined herein as well as mapping the event specific fields to the table and field as described in the event type's specific schema. According to another embodiment, the monitoring system may generate a unique identifier for every event processed and stored in the system's database(s), which may be used for subsequent indexing, correlation and reporting. According to one embodiment, suitable indexed fields may be part of the schema definition that allows for increased efficiency in accessing the stored data, generating reports and in processing events. The normalized event generally may contain the same data as contained in an event record, but it may be formatted and indexed for a database.

According to one embodiment, the monitoring system may maintain tables (in a database 132) that correspond to known users and associated identifiers for an organization. According to one embodiment, the monitoring system may be sufficiently flexible to leverage existing identity management systems for the maintenance of the users and identifiers. These systems may include directories such as Active Directory or Identity Management systems from vendors such as Computer Associates, BMC, Sun, IBM, Novell. Generally, the system is flexible enough to leverage existing identity sources of all kinds or to maintain the identities itself in a repository.

5. Known User Correlation. According to one embodiment, the monitoring system may be flexible in that, depending on the processing environment and application of the system, it may correlate events to known users in real-time as the events are processed. According to another embodiment, the system may correlate the events to known users during off-line processing. In both cases, the result is that events processed by the system are correlated to the known users of an organization and used for security reporting, fraud detection, monitoring, etc., as discussed herein.

Figure 2:
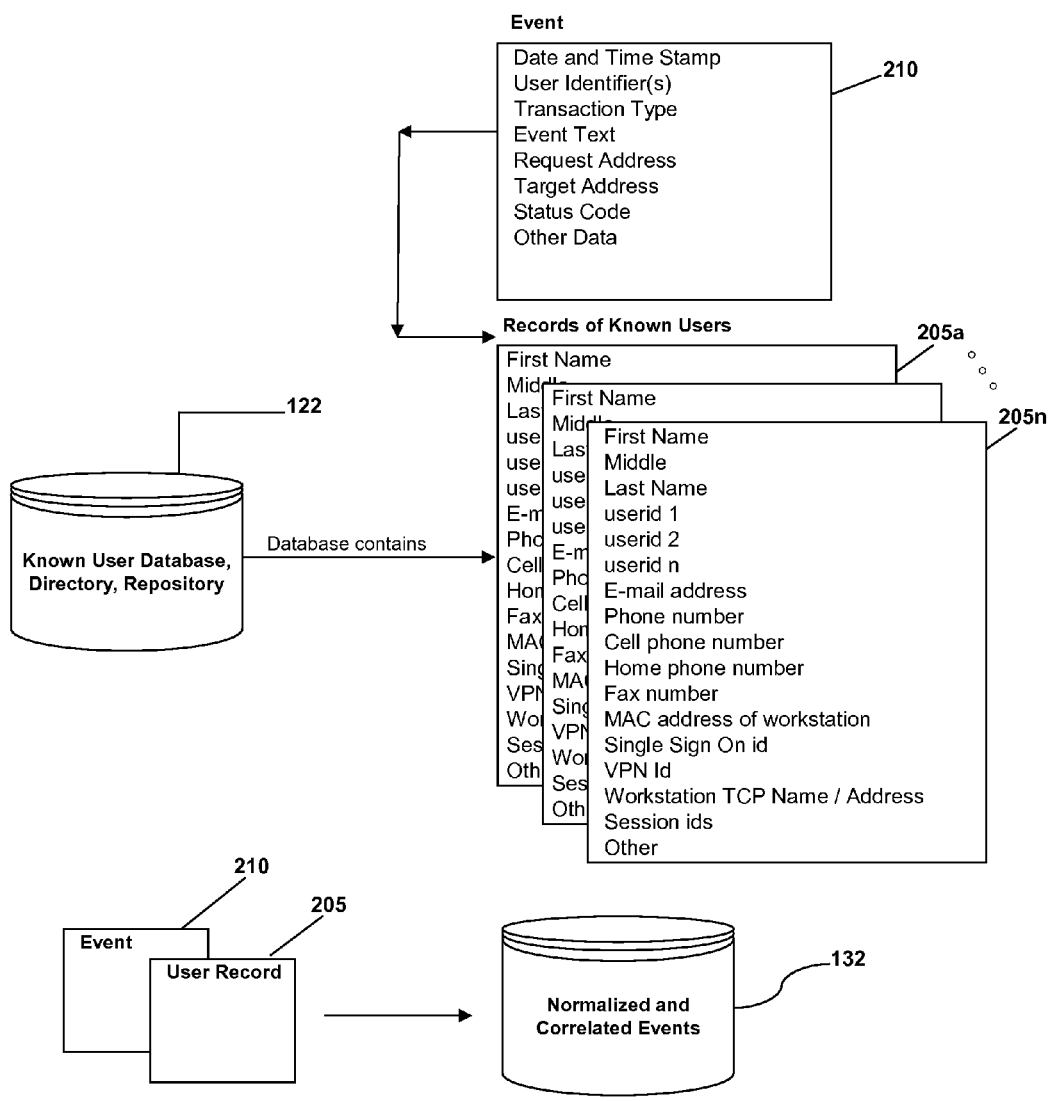
FIG. 2 illustrates one process of correlating events to known users according to one embodiment of the invention.

According to one embodiment of the invention, FIG. 2 illustrates a diagram of a process for correlating events 210 to records of known users 205. The monitoring system may produce the normalized event 210 by the general process outlined earlier herein. According to one embodiment, the normalized event 210 may contain one or more User identifier(s), examples of which include: e-mail address, userid(s), database ids, phone number, TCP/IP address, MAC address, single sign on id, session id or any other id that may correlate uniquely to a user given an organization's environment.

According to one embodiment, the system may access a directory, database or other repository of users 122 and associated identifiers, examples of which are shown in the records of known users 205. Therefore, as shown in FIG. 2, particular users may be associated with a wide variety of identifiers. Some of these identifiers may be maintained on a permanent basis while other identifiers, such as session ids, may only be maintained for a short duration, while a particular session of the user is current or has been recently created. Likewise, different variants of a particular type of identifier may also be maintained, for example, if a user has multiple e-mail addresses or multiple telephone numbers, all of these may be stored in user repository 122.

According to one embodiment of the invention, the monitoring system may correlate an event 210 to records of a known users 205 based on matching identifier(s). According to one embodiment of the invention, event 210 and user record 205 may be linked together in a repository 132 that contains normalized and correlated events. Session ids, and similar temporary identifiers may be captured from event records and maintained so that events 210 may be correlated to a record of known users 205 even though the event 210 may not have an identifier that directly links the event 210 to the record of known users 205. Such temporary identifiers may be maintained in the user repository 122 or as a record in some other repository which may be linked back to the known user's record in the user repository 122. At some point in this flow, the session id (as an example of a temporary id) should have been linked to the user within some log event. For example, a VPN typically generates a session id in association with a user login event, then subsequently only "logs" session id in events associated with that user. However, the monitoring system may track the session id based on the initial user login event so that activities of the user, identified only by the session id in event logs, can also be tracked back to the specific known user.

According to another embodiment of the invention, events for which there are no correlating user records may be stored in the database under special tables that allow reporting and additional processing.

According to one embodiment of the invention, FIG. 3 provides exemplary XML definitions 301 that may be used for event parsing.

According to one embodiment of the invention, fraud and/or misuse detection may be performed through analysis of uncorrelated events. Some fraud and misuse scenarios may be detected prior to the correlation of an event to a user. This enables the monitoring system to monitor resources of an organization and generally detect behaviors that are considered high risk, before a particular user has been identified as suspicious. For example, the monitoring system may generate an alert and alert record using any of the following techniques:

When any user, or user in a particular category, performs a certain volume of transactions or activities over a specified time interval;

When any use, or user in a particular category, performs a pre-defined sequence of transactions or activities;

When any user, or user in a particular category, accesses resources outside of pre-defined hours of the day;

When any user, or user in a particular category, changes or accesses a pre-identified resource such as a database field, file, application filed; and/or When any user, or user in a particular category, changes or accesses resources associated with a pre-identified entity such as records associated with a famous person who checked into a hospital or records that correspond to particular customers or partner.

According to another embodiment of the invention, fraud and/or misuse detection may be performed through analysis correlated events. Some fraud and misuse scenarios may be detected when events have been correlated to users. For example, the monitoring system may generate an alert and generate an alert record using any of the following techniques:

When any user carries out activities or transactions that are outside of pre-defined characteristics of that their relationship to the organization (job function, supplier relationship, customer relationship, etc.);

When a user carries out activities or transactions that are inconsistent with the historically established behavior of that user (or a category of users to which the user belongs);

When a pre-identified user performs pre-defined activities, transactions or gains access to system;

When a user accesses resources from an address (TCP/IP, MAC, domain, other) that is inconsistent with the past accesses; and/or When a user conducts activities or transactions that link the user to previously established suspicious users.

Examples of the Fraudulent of Business Information Systems

The fraudulent use of business information systems may take many forms, may involve variously sophisticated participants and techniques. According to one embodiment, the monitoring system may be applied to specific forms of fraud or may be used as a more general platform against more sophisticated forms of fraud. According to one embodiment, the monitoring system may perform monitoring, reporting, and/or incident research relating to fraud conducted in conjunction with known users (or user identifiers) of an organization. These fraudulent scenarios may go undetected by using the current art of firewall, intrusion detection and prevention, authentication/authorization techniques. It should be noted that these scenarios are exemplary only and one skilled in the art would recognize various alternatives and modifications all of which are considered as a part of the invention.

1. Sale of Customer Records. For many industries, knowledge of customers represents lucrative information. Long-term healthcare, mortgage, high value financial services are all example industries in which employees, partners, suppliers and other known entitles may gain access to applications, databases, etc. via known user ids. Unscrupulous users may sell this information to competitors or other parties. According to one embodiment of the invention, the monitoring system may track which users are accessing which customer data to determine in advance if any misuse situation arises, for example, if a sales person is accessing information unrelated to any of his sales clients.

2. Unauthorized Disclosure to Protected Health Information. Within the healthcare field, access to Protected Health Information (PHI) is protected by law. Persons with general access to systems, which have access to PHI, may act in collaboration with a third party to obtain PHI about a neighbor, a relative, a coworker, a famous person or a person of power in order to black-mail the victim or to view confidential information that is protected by law. Medicare fraud is also common practice and may include a ring of conspirators that act together to submit false or inflated claims. This scheme may require known/trusted users to falsify the systems within a care provider. According to one embodiment of the invention, the monitoring system may closely track which user is accessing data about a famous patient or track whether a group of users are accessing relevant data about one or more patients in such a manner that the combined data accessed may be misused.

3. Changing the Ship-to Address on an Order. Organizations that process orders electronically may have the "ship-to" address changed by an existing user, such as an employee. In this case, the employee may change the address to a destination where the employee may capture the order and sells the order on the open market. Typically, this act of fraud goes undetected until the original purchaser refuses to pay an invoice or complains that the order never arrived. According to one embodiment, the monitoring system may track which user's are changing the ship-to address or if a user is changing ship-to addresses on a regular basis. Correlating the events around the transaction takes many man hours using the current state of the art.

4. Departing Employee Capturing the Customer Database. Departing sales persons are well-known for obtaining an electronic or printed copy of the customer database and prospect pipeline. They may use this data in a new position which may be with a competitive firm. According to one embodiment of the invention, the system may provide reporting and general detection capabilities and may correlate application and database activity to the user in question for review. According to one embodiment of the invention, the monitoring system may track to see if a sales person is accessing a relatively large number of sales records or if a sales person is accessing the records of customers with whom the sales person has no relationship.

5. Exploiting Weak Authentication via the Corporate Extranet or VPN. Corporate Extranets and VPN's are most typically authenticated via userid and password. As a partner to the company, a known user may have access to sensitive information such as pricing, inventory levels, inventory warehouse locations, promotions, etc. If the user leaves the "partner" firm and moves to a competitive firm, the user may still use the same userid and password to gain competitive access to the sensitive information. According to one embodiment of the invention, the monitoring system may associate the userid with a particular IP address (or domain) and raise an alert if the IP address or domain is that of competitor or an entity that is not a partner firm.

6. Non-repudiation for Bond Traders. Bond traders often speculatively purchase these securities in anticipation of market movements. In the event the markets take unexpected moves, the bond traders may deny the characteristics of their electronic order. According to one embodiment of the invention, characteristics and stages of an electronic transaction may be correlated to the known user (the trader) in order to negate any such fraudulent claim by the trader.

7. Financial Insider Trading Rings. Insider trading rings may comprise many collaborators using various electronic systems including applications, e-mail, phone, and/or fax. According to one embodiment of the invention, the monitoring system may be used to detect suspicious behaviors or may be used in incident investigations to identity all conspirators. A typical scenario is for one party to receive "inside information" from an outside source via some electronic means. The first source then collaborates with others to conduct trades that generate fraudulent profits based on the ill-gotten information. According to one embodiment of the invention, the monitoring system may detect such activities at a much earlier stage than might be possible using conventional insider trading detection methods.

8. Web Services. Business information systems are often published as web services. While authentication and authorization standards are established, the same rogue users that plague traditional systems often take advantage of a published web service. According to one embodiment of the invention, the system may provide reporting and general detection capabilities and may correlate application and database activity to the user in question for review.

Figure 4:
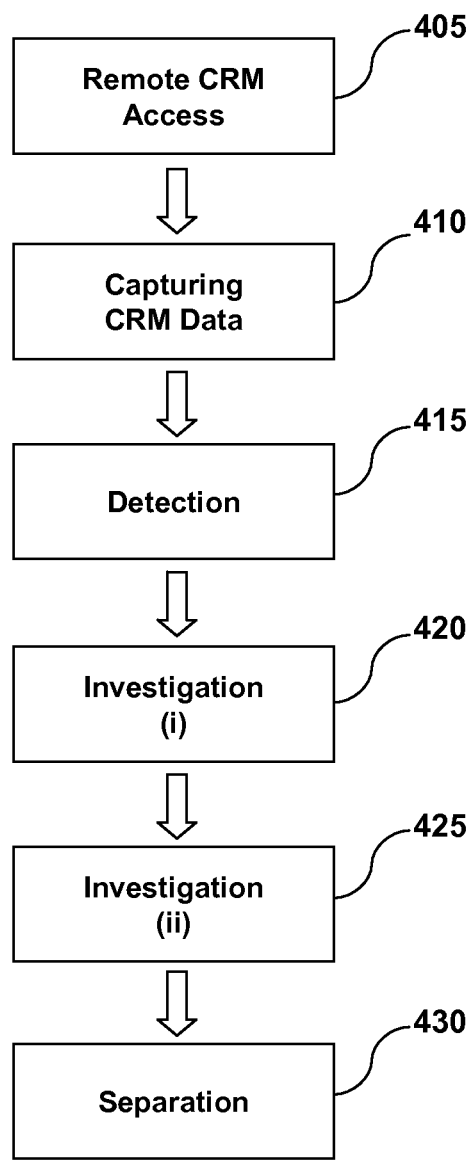
FIG. 4 illustrates a flow diagram of fraud detection according to one embodiment of the invention.

According to one embodiment of the invention, FIG. 4 illustrates operations in the use of the monitoring system to detect misuse based on the actions of a departing employee. According to one exemplary scenario, a sales person who is an employee of the Organization has accepted a comparable position with a competitive firm. The employee has not notified the Organization of their intent to leave and is continuing to work in a business as usual appearance. The employee has decided to accumulate as many information resources as possible that may help with new business at their next position.

1. Customer and Prospect Record Access. As part of their job, the Employee has access to detailed information on the Organization's customer and prospects. Customer and prospect records are maintained in a CRM (Customer Relationship Management) application, which is available through the Organization's VPN and Extranet. The CRM application has a privilege management system for limiting access to records to the "owner of the record" only. However, due to the collaborative nature of the sales and support process, this feature is rarely used, so that all employees have access to all records.

2. Remote Data Capture. Knowing specifics on customers and prospects who are actively engaged with the Organization could be valuable in saving time and generating new business at their next position. In operation 405, the Employee decides to access the CRM application through the corporate VPN and to capture prospects and customers of the Organization in operation 410. The Employee's work location is in a remote office, away from the Organization's headquarters, so the Employee is comfortably able to take an entire morning accessing the CRM system to electronically capture over 125 customer and prospect records. The electronically captured customer and prospect records are then forwarded to a personal "hotmail" e-mail account. The Employee intended to access another 200 records at later times.

3. Detection. According to one embodiment of the invention, the monitoring system may be configured to monitor access to CRM, VPN and internet proxy logs. The monitoring system may be configured to alert the security team in the event that more than 50 customer or prospect records are accessed in a specific (for example, four hour) time period. Thus, actions of the departing Employee may trigger a security alert in operation 415.

4. Investigation. According to one embodiment of the invention, in operations 420 and 425, the monitoring system may facilitate a forensic investigation once an alert has been generated. Once the security team had been alerted of a potential incident, they can run a report from the monitoring system which has captured events from the VPN, CRM and internet proxy born the last 30 days. According to one embodiment, from this report, the security team may be able to determine that the employee had remotely accessed 125 customer and prospect records through the corporate VPN and that the employee had also sent a series of e-mails to a hotmail account during the same time period. According to one embodiment, this analysis may be performed using automated rules to determine that a fraud/misuse situation has been detected.

According to one embodiment of the invention, the security team can then forward this information or an automated alert can be forwarded to the Human Resources department of the Organization. In operation 430, the Organization may then be able to confront the Employee with the facts, limiting future damages and enable the Organization to work through the Employee Separation in an informed manner. Alternatively, the monitoring system may automatically disable or suspend the access of the Employee to the Organization's system, so that future damage can be prevented before the situation with the Employee can be further evaluated.

Figure 5:
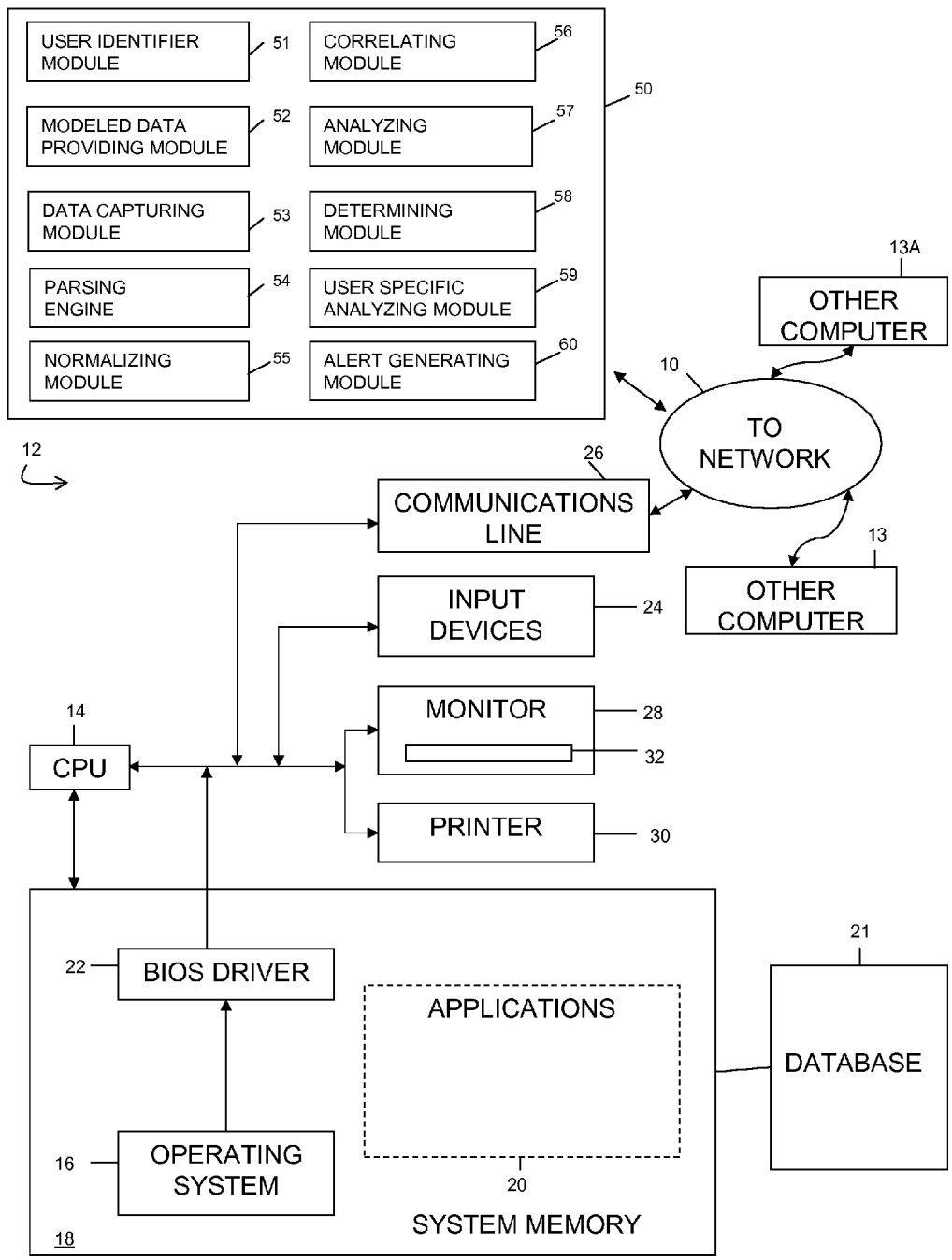
FIG. 5 illustrates a general purpose computing system that is connected to a network that may be used to implement one or more aspects of the monitoring system.

According to one embodiment of the invention, FIG. 5 illustrates the components of a computing system connected through a general purpose electronic network 10, such as a computer network. The computer network 10 may be a virtual private network or a public network, such as the internet. As illustrated in FIG. 5, the computer system 12 may include a central processing unit (CPU) 14 that is connected to a system memory 18. System memory 18 may include an operating system 16, a BIOS driver 22, and application programs 20. In addition, computer system 12 may include input devices 24, such as a mouse or a keyboard 32, and output devices such as a printer 30 and a display monitor 28, and a permanent data store, such as a database 21. Computer system 12 may include a communications interface 26, such as an Ethernet card, to communicate to the electronic network 10. Other computer systems 13 and 13A may also be connected to the electronic network 10, which can be implemented as a Wide Area Network (WAN) or as an inter-network, such as the Internet.

According to one embodiment, computer system 12 may include a monitoring server 50 that implements the monitoring system or its parts discussed herein, including programmed code that implements the logic and modules discussed herein with respect to FIGS. 1-4. One skilled in the art would recognize that such a computing system may be logically configured and programmed to perform the processes discussed herein with respect to FIGS. 1-4. It should be appreciated that many other similar configurations are within the abilities of one skilled in the art and it is contemplated that all of these configurations could be used with the methods and systems of the invention. Furthermore, if should be appreciated that it is within the abilities of one skilled in the art to program and configure a networked computer system to implement the method steps of certain embodiments of the invention, discussed herein.

According to one embodiment, monitoring server 50 may include a user identifier module 51 that provides data corresponding to computer users, a modeled data providing module 52 that provides fraud detection information and misuse detection information, a data capturing module 53 that provides application layer data and data corresponding to transactions and activities that are associated with computer users, a parsing engine 54 that extracts application layer data and data corresponding to transactions and activities that are associated with the computer users, a normalizing engine 55 that normalizes the data extracted by the parsing engine, a correlating module 56 that correlates the normalized data, an analyzing module 57 that analyzes the correlated information and the modeled data, a determining module 58 that determines whether the correlated information corresponds to at least one of the fraud detection information and misuse detection information, a user specific analyzing module 59 that analyzes the correlated information for user specific fraud detection information based on the computer users identity, a pre-defined role associated with each computer user, and/or a pre-defined relationship that is defined for the computer users, and an alert generating module 60 that generates alerts. It should be readily appreciated that a greater number or lesser number of modules may be used. One skilled in the art will readily appreciate that the invention may be implemented using individual modules, a single module that incorporates the features of two or more separately described modules, individual software programs, and/or a single software program.

Figure 6:
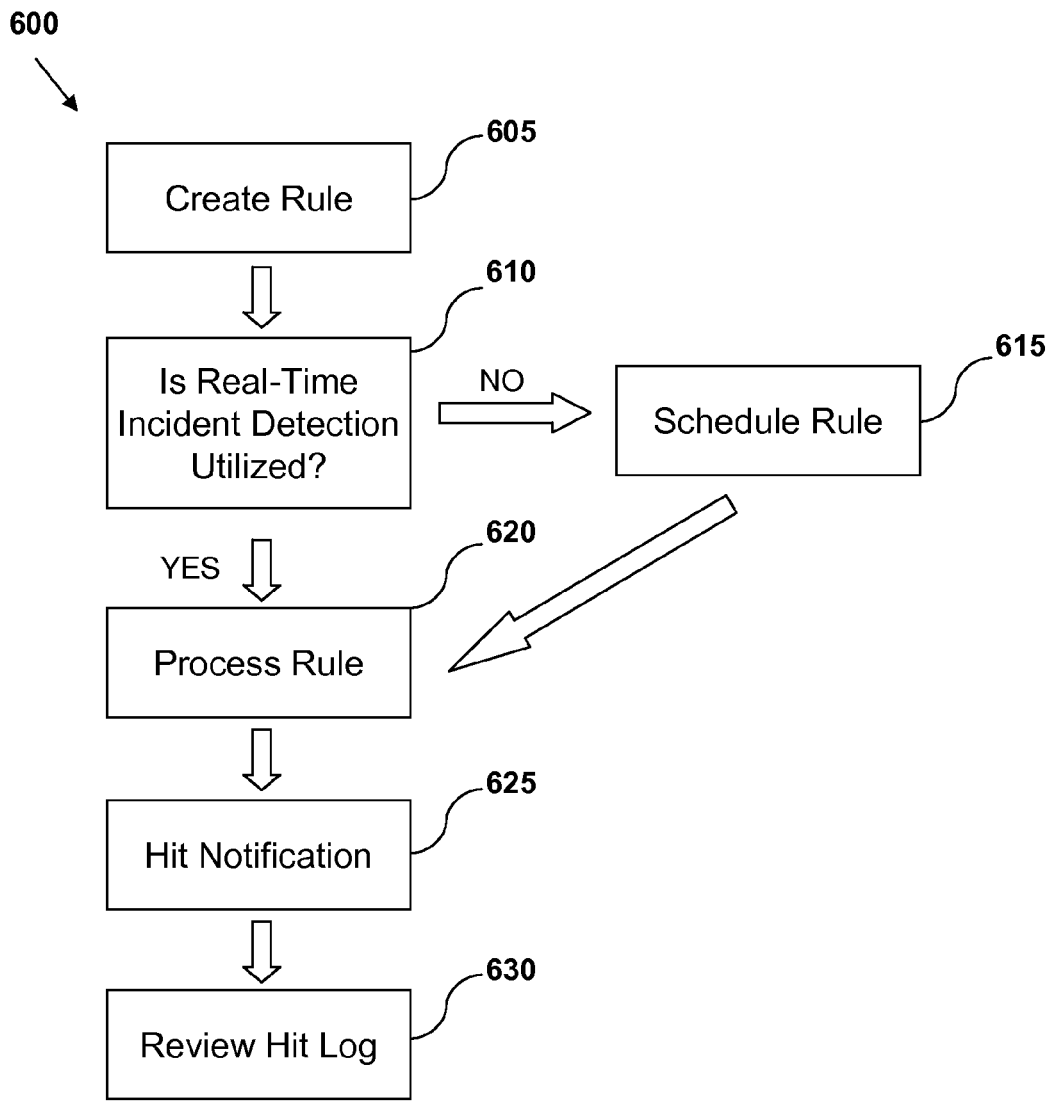
FIG. 6 illustrates a flow diagram of fraud or misuse detection process according to another embodiment of the invention.

According to one embodiment of the invention, FIG. 6 illustrates a rule engine or process 600 that enables automatic detection of incidents which may be related to fraud or misuse of data, such as violations of the Health Insurance Portability and Accountability Act (HIPAA), identity theft and medical identity theft. The rule can monitor transactions and/or activities that are associated with the data, for example, accessing of the data by a user or non-user of the system storing the data. Process 600 can utilize one or more of the components described above with respect to system 12, including the various modules for capturing, parsing, correlating, normalizing, analyzing and determining incidents that arise from the transactions and/or activities associated with the data of the computer environment, including the one or more databases having the data. The rule engine 600 is not intended to be limited to any particular type of computer environment or data or any particular type of fraud or misuse of the data. However, the type of data and type of fraud or misuse of the data can be a basis, at least in part, for one or more criteria of a rule for monitoring the transactions and/or activities associated with the data or computer environment.

In step 605, a rule is created by the user and/or a third party, such as a consultant with particular knowledge as to fraud or misuse of the particular type of data. The rule can include algorithms, database queries and/or data analysis methods to define and/or detect fraud incidents and misuse incidents. Various criteria can be used for generating or creating the rule. The criteria can be related to the transactions and/or activities that are indicative of fraud or misuse of the data. For example, process 600 can create or generate a rule based on one or more of the following parameters:

Timeframe criteria can be utilized, such as a date range or a user-friendly time concept, e.g., yesterday, last month, last quarter.

Volume threshold criteria can be utilized based on the number of events found. The volume threshold criteria could be used in conjunction with the timeframe criteria.

Field value matching criteria can be utilized which allows a user to select an event source, and then allows a user to select a field and a value for that field.

Categorized field value matching criteria can be utilized which allows a user to choose a category and a pattern to match.

Common user name matching criteria can be utilized which allows a user to select a common user name to be searched across all supported applications. The common user name matching criteria can be implemented where the user data for each application is imported.

Step 605 also allows a user to designate the criteria related to the notice or alert that can be used when a rule is triggered. In one embodiment, an email address of the entity to be notified of the triggering of the rule can be designated. Process 600 can use the email address of rule creator as a default for the alert. In one embodiment, the type of notice can be designated such as text to be sent in an email so the user will know which rule was tripped and any specific information that can be provided.

The scope of the rule can include a single event source, such as finding matches in a single system. For example, single event source rules can accent pattern matches with timeframe and/or volume threshold criteria. As another example, a rule could determine when access has been gained to a pre-determined number of medical records over a pre-determined time interval. Such behavior can be indicative of medical identity theft. The scope of the rule can include multiple event source rules, such as finding matches across multiple systems. For example, multiple event source rules could monitor for common user names or access to particular data categories.

In step 610, it can be determined whether real-time incident detection is being implemented by process 600. Real-time incident detection processes the rule as each event is read and before insertion into a database. Process 600 can apply real-time incident detection to some, most or all of the rules that have been created in step 600.

In step 615, any rule that is not subject to real-time incident detection can be scheduled for processing. The schedule can be time-based and/or can utilize other factors for determining the schedule, such as system activity. The particular schedule can be related to the criteria of the rule. For example, a rule that monitors access to a pre-determined volume of medical records over a pre-determined time period may be scheduled to be processed at intervals of the pre-determined time period. An example of an application that can be used to schedule the rule is Quartz.

The present disclosure also contemplates adjustable or dynamic scheduling of the rule. A user can designate one or more criteria for scheduling the rule and the schedule cart be built and thereafter automatically adjusted based upon the one or more criteria. For example, a time interval between processing of the same rule can be adjusted based upon such factors as system activity or the amount of accessible data.

In step 620, the rule can be implemented or processed. Any rule that finds one or more matches can create a database entry, such as in a database of system 12 described above with respect to FIG. 5, indicating a hit or triggering of the rule. The hit also can cause the notice or alert to be generated and sent to the designated recipient as in step 625.

Based upon the receipt of the alert or notice, a user can access system 12 for additional information pertaining to the rule or plurality of rules that has been triggered as in step 630. The additional information can provide the specific time of triggering the rule, as well as all other times the rule was triggered. A specific link can be provided in the notice or alert so that the user is brought directly to the relevant information pertaining to the hit when accessing system 12.

Figure 7:
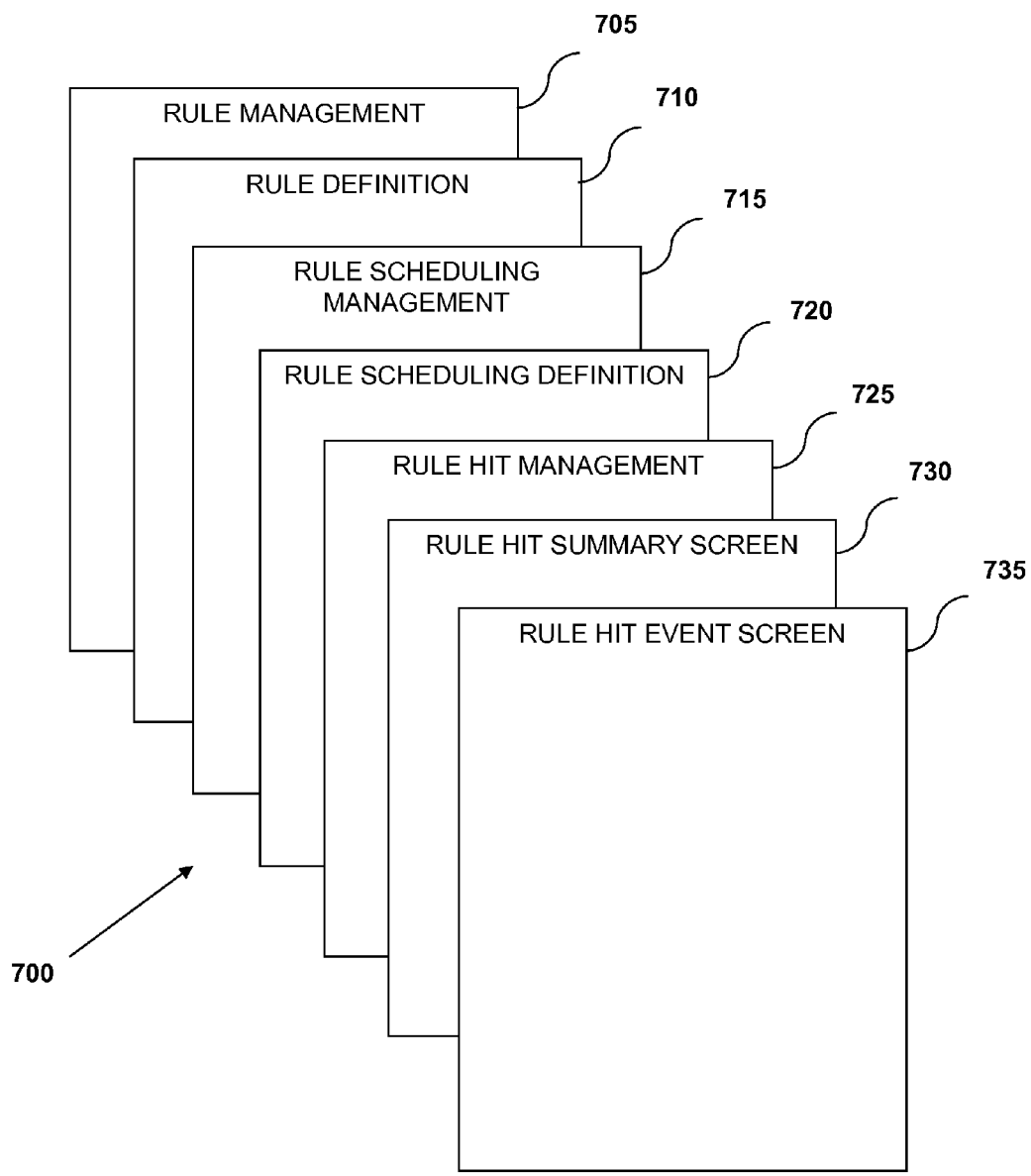
FIG. 7 illustrates a user interface for a system that utilizes the process of FIG. 6.

In one embodiment of the invention, FIG. 7 illustrates a user interface 700 for the rules process 600. A rule management page or window 705 can indicate to a user all of the defined rules. The rule management page 705 can also be used by the user for creating, modifying or deleting rules. A rule definition page or window 710 can also be used for inputting information to define a new rule. A rule scheduling management page or window can indicate to a user all of the schedules of the rules. The rule scheduling management page 715 can also be used to create new schedules, modify existing schedules, and/or delete schedules. A rule schedule definition page or window 720 can be used to define the schedule for the rule to run.

A rule bit management page or window 725 can indicate to a user all rules that have had matches and the number of matches per rule. A rule bit summary screen or window 730 can indicate to a user all the entries in the database for hits for a particular rule. The rule hit summary screen 730 can show the date that the rule was triggered and the actual events that caused the rule to trigger. A rule hit event screen or window 735 can indicate to a user the one or more events that caused the rule to trigger. Manipulation between the pages or windows and between information on those pages or windows can occur by various techniques including drill-down menus and new windows. The present disclosure contemplates use of the same window for each of the functions described above.

Referring to FIG. 8, the system 12 or a module thereof can be used in combination with audit logs 1100 for detection of various fraud or misuse scenarios. For example, the audit logs 1100 can be analyzed based upon various criteria as described above to detect employee self-examination, family member snooping, VIP snooping, snooping on co-workers who are patients, snooping whole other family (neighbors, etc). The criteria can include a high volume of billing/contact modifications, a high volume of downloading/printing functions, "Break-the-glass" functions, high activity levels for patients or users in a timeframe and/or unusual login activity. One of ordinary skill in the art can use other criteria and other combinations of criteria for detecting fraud and misuse based upon the audit logs.

Referring to FIG. 9, the system 12 or a module thereof can be used in combination with audit logs 1100 and select patient data 1200 for detection of various fraud or misuse scenarios. For example, the audit logs 1100 and select patient data 1200 can be analyzed based upon criteria including accessing patients who were discharged over a year ago or other specified time period or a patient who normally goes to the doctor once a year and suddenly goes 25 times in a year or some other unusual number of times.

Figure 10:
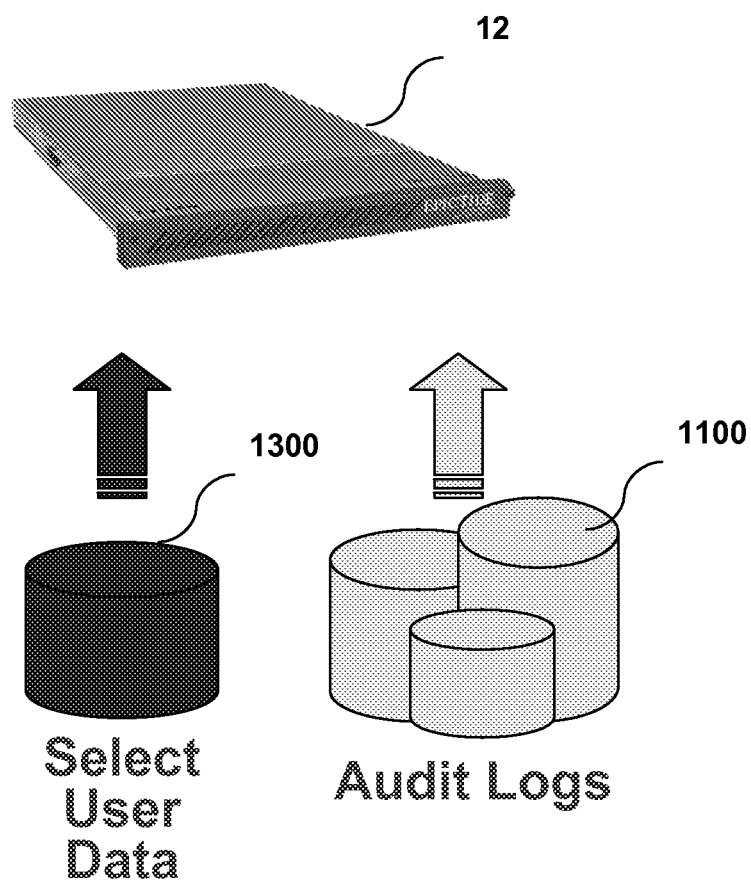
FIG. 10 illustrates a flow chart for detection of various fraud or misuse scenarios based upon audit logs and select user data in another embodiment of the invention.

Referring to FIG. 10, the system 12 or a module thereof can be used in combination with audit logs 1100 and select user data 1300 for detection of various fraud or misuse scenarios. For example, the audit logs 1100 and select user data 1300 can be analyzed based upon criteria including remote physician staff accessing patients that aren't under their physician's care, accessing patients outside of their normal work area, accessing patients outside of their normal work shift or non-payroll user accessing payroll functions. Other criteria can also be used including patients with highest activity levels in a timeframe, users with highest activity levels in a timeframe, users with unusually long login sessions, users with high numbers of login failures and specific functions like blood type modifications.

As noted above, embodiments within the scope of the invention include program products comprising computer-readable media for carrying or having computer-executable instructions or data structures stored thereon. Such computer-readable media can be any available media which can be accessed by a general purpose or special purpose computer. By way of example, such computer-readable media can comprise RAM, ROM, EPROM, EEPROM, CD-ROM or other optical disk storage, magnetic disk storage or other magnetic storage devices, or any other medium that can be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection may be properly termed a computer-readable medium. Combinations of the above are also be included within the scope of computer-readable media. Computer-executable instructions may include, for example, instructions and data which cause a general purpose computer, special purpose computer, or special purpose processing device to perform a certain function or group of functions.

The invention is described in the general context of operational steps which may be implemented in one embodiment by a program product including computer-executable instructions, such as program code, executed by computers in networked environments. Generally, program code may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represent examples of corresponding acts for implementing the functions described in such steps.

The present invention in some embodiments, may be operated in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Other embodiments of the invention will be apparent to those skilled in the art from a consideration of the specification and the practice of the invention disclosed herein. It is intended that the specification be considered as exemplary only, with the true scope and spirit of the invention also being indicated by the disclosure herein and equivalents thereof.

The invention claimed is:

1. A method of detecting improper access of protected data by an authorized user, the method comprising:
   extracting event data from an event log file including information associated with an attempt to access protected data, the extracting being performed by a computer system configured to recognize and parse the event data within the event log file for each of a plurality of different file formats to enable a monitoring system implemented by a processor to oversee user activity across a plurality of applications for determining the attempt to access the protected data is fraudulent or indicative of probable misuse;

normalizing the event data based on a predefined format;

processing the normalized event data to determine an identifier associated with the attempt to access the protected data, the identifier being indicative of one or more of an authorized user of a system associated with the protected data, a device used to attempt to access the protected data, an authorized user of the device used to attempt to access the protected data, a location of the device used to attempt to access the protected data, or a time of the attempt to access the protected data;

processing the normalized event data and the identifier to determine whether the attempt to access the protected data is fraudulent or indicative of probable misuse based on at least one rule applied by the monitoring system;

generating a notification based on a determination that the attempt to access the protected data is fraudulent or indicative of probable misuse; and causing one or more of an alert based on the notification to be output to a display communicatively coupled with the monitoring system or to an electronic device communicatively coupled with the monitoring system, wherein
the monitoring system continuously processes the normalized event data and the identifier according to a predefined schedule, and
the event log file corresponds with an application of the plurality of applications accessible by the authorized user, each application of the plurality of applications has a corresponding event log file, and the event log file of each application of the plurality of applications has a file format of the plurality of different file formats.

2. The method of claim 1, wherein the protected data is a patient's protected health information.

3. The method of claim 1, wherein the protected data is business information associated with customer relationship management.

4. The method of claim 1, wherein the normalized event data comprises one or more types of data including a time of the attempt to access the protected data, a user id, a type of the attempt to access the protected data, a request address, a target address, event text, or a status code.

5. The method of claim 4, further comprising:
storing the normalized event data in a database,
wherein the normalized event data is a first instance of a plurality of instances of normalized event data stored in the database, and at least one different instance of the plurality of instances of normalized event data comprises one or more different types of data.

6. The method of claim 5, wherein the database comprises a list of authorized users of the system associated with the protected data, and the method further comprises:
establishing a behavioral profile for one or more of the authorized users of the system associated with the protected data, the behavioral profile including one or more instances of normalized event data associated with the one or more authorized users of the system associated with the protected data,
wherein the at least one rule is a basis for determining if the attempt to access the protected data is consistent with the established behavioral profile, and the attempt to access the protected data is determined to be fraudulent or indicative of probable misuse if the attempt to access the protected data is inconsistent with the established behavioral profile.

7. The method of claim 5, wherein processing the normalized event data to determine the identifier comprises:
correlating the first instance of normalized event data with the other instances of normalized event data stored in the database to determine the identifier.

8. The method of claim 5, wherein processing the normalized event data and the identifier to determine whether the attempt to access the protected data is fraudulent or indicative of probable misuse based on at least one rule implemented by the monitoring system comprises:
correlating the first instance of normalized event data with the other instances of normalized event data stored in the database to determine a set of activities performed by the authorized user of the system associated with the protected data,
wherein the at least one rule is a basis for determining if the set of activities performed by the authorized user of the system associated with the protected data deviates from an allowable set of activities.

9. The method of claim 8, wherein the allowable set of activities comprises a predefined sequence of activities.

10. The method of claim 1, wherein the at least one rule comprises a maximum quantity of attempts to access the protected data within a predetermined period of time.

11. The method of claim 1, wherein the at least one rule comprises an allowable location from which the attempt to access the protected data is permissible.

12. The method of claim 1, wherein the at least one rule comprises a maximum amount of time after the protected data was last attempted to be accessed.

13. The method of claim 1, wherein the notification is generated in real-time.

14. The method of claim 1, further comprising:
tracking interactions between the authorized user of the system associated with the protected data and one or more other authorized users of the system associated with the protected data, the one or more other authorized users of the system associated with the protected data having been identified as being suspicious based on previous involvement with one or more other attempts to access the protected data identified as being fraudulent or indicative of probable misuse,
wherein the at least one rule comprises a basis for determining the attempt to access the protected data is fraudulent or probable of misuse based on at least one of the interactions between the authorized user of the system associated with the protected data and the one or more other authorized users of the system associated with the protected data.

15. The method of claim 1, further comprising:
causing a rule management interface to be displayed, the rule management interface comprising at least one input field for generating the at least one rule.

16. The method of claim 1, further comprising:
processing one or more of the normalized event data or the identifier to ascertain a name of the authorized user of the system associated with the protected data.

17. An apparatus comprising:
a processor; and
at least one memory including computer program code for one or more programs, the at least one memory and the computer program code configured to, with the processor, cause the apparatus to:

extract event data from an event log file including information associated with an attempt to access protected data, the apparatus being configured to recognize and parse the event data within the event log file for each of a plurality of different file formats to enable a monitoring system implemented by the processor to oversee user activity across a plurality of applications for determining the attempt to access the protected data is fraudulent or indicative of probable misuse;

normalize the event data based on a predefined format;

process the normalized event data to determine an identifier associated with the attempt to access the protected data, the identifier being indicative of one or more of an authorized user of a system associated with the protected data, a device used to attempt to access the protected data, an authorized user of the device used to attempt to access the protected data, a location of the device used to attempt to access the protected data, or a time of the attempt to access the protected data;

process the normalized event data and the identifier to determine whether the attempt to access the protected data is fraudulent or indicative of probable misuse based on at least one rule applied by the monitoring system;

generate a notification based on a determination that the attempt to access the protected data is fraudulent or indicative of probable misuse; and cause one or more of an alert based on the notification to be output to a display communicatively coupled with the monitoring system or to an electronic device communicatively coupled with the monitoring system, wherein the monitoring system is configured to continuously process the normalized event data and the identifier according to a predefined schedule, and the event log file corresponds with an application of the plurality of applications accessible by the authorized user, each application of the plurality of applications has a corresponding event log file, and the event log file of each application of the plurality of applications has a file format of the plurality of different file formats.

18. A non-transitory computer-readable storage medium carrying computer-readable instructions which, when executed by a processor, cause an apparatus to:

extract event data from an event log file including information associated with an attempt to access protected data, the apparatus being configured to recognize and parse the event data within the event log file for each of a plurality of different file formats to enable a monitoring system implemented by the processor to oversee user activity across a plurality of applications for determining the attempt to access the protected data is fraudulent or indicative of probable misuse;

normalize the event data based on a predefined format;

process the normalized event data to determine an identifier associated with the attempt to access the protected data, the identifier being indicative of one or more of an authorized user of a system associated with the protected data, a device used to attempt to access the protected data, an authorized user of the device used to attempt to access the protected data, a location of the device used to attempt to access the protected data, or a time of the attempt to access the protected data;

process the normalized event data and the identifier to determine whether the attempt to access the protected data is fraudulent or indicative of probable misuse based on at least one rule applied by the monitoring system;

generate a notification based on a determination that the attempt to access the protected data is fraudulent or indicative of probable misuse; and cause one or more of an alert based on the notification to be output to a display communicatively coupled with the monitoring system or to an electronic device communicatively coupled with the monitoring system, wherein the monitoring system is configured to continuously process the normalized event data and the identifier according to a predefined schedule, and the event log file corresponds with an application of the plurality of applications accessible by the authorized user, each application of the plurality of applications has a corresponding event log file, and the event log file of each application of the plurality of applications has a file format of the plurality of different file formats.

19. The method of claim 1, further comprising:

storing the notification as a hit in a hit log database.

\* \* \* \* \*